United States Patent [19]
Medved et al.

[11] Patent Number: 5,646,761
[45] Date of Patent: Jul. 8, 1997

[54] WIRELESS COMMUNICATION SYSTEM

[75] Inventors: David Medved; Hillel Bar Lev; Leonid Davidovich, all of Jerusalem, Israel

[73] Assignee: Jolt. Ltd., Israel

[21] Appl. No.: 522,526

[22] Filed: Sep. 5, 1995

Related U.S. Application Data

[63] Continuation of Ser. No. 126,800, Sep. 24, 1993.

[51] Int. Cl.$^6$ ................................... H04B 10/00
[52] U.S. Cl. .............................. 359/172; 359/152
[58] Field of Search ........................ 359/152, 154, 359/155, 172

[56] References Cited

U.S. PATENT DOCUMENTS

| | | | |
|---|---|---|---|
| 2,257,319 | 9/1941 | Williams | 359/159 |
| 2,982,859 | 5/1961 | Steinbrecher | 359/159 |
| 3,227,882 | 1/1966 | Bissett et al. | 359/155 |
| 3,341,707 | 9/1967 | Wingfield et al. | 359/159 |
| 3,511,998 | 5/1970 | Smokler | 359/159 |
| 4,236,255 | 11/1980 | Burgener et al. | 359/152 |
| 4,249,159 | 2/1981 | Stasko | 340/26 |
| 4,680,811 | 7/1987 | Harper et al. | 359/152 |
| 4,691,385 | 9/1987 | Tupman | 359/144 |
| 4,823,402 | 4/1989 | Brooks | 359/155 |
| 4,916,622 | 4/1990 | Raman et al. | 364/459 |
| 4,994,681 | 2/1991 | Mann | 250/561 |
| 5,027,433 | 6/1991 | Menadier et al. | 455/606 |
| 5,060,304 | 10/1991 | Solinsky | 359/152 |
| 5,113,403 | 5/1992 | Block et al. | 359/152 |
| 5,114,227 | 5/1992 | Cleveland, Jr. | 356/152 |
| 5,117,301 | 5/1992 | Tsumura | 359/154 |
| 5,142,400 | 8/1992 | Solinsky | 359/159 |
| 5,253,095 | 10/1993 | Menadier et al. | 359/174 |
| 5,291,195 | 3/1994 | Gross | 340/958 |
| 5,295,212 | 3/1994 | Morton et al. | 385/57 |
| 5,317,442 | 5/1994 | Sharp et al. | 359/170 |
| 5,359,446 | 10/1994 | Johnson et al. | 359/152 |

*Primary Examiner*—Hezron E. Williams
*Assistant Examiner*—Richard A. Moller
*Attorney, Agent, or Firm*—Scully, Scott, Murphy and Presser

[57] ABSTRACT

A wireless communication system, having first and second communication units located, in operation, in spaced-apart relationship to each other, each unit including a transmitter and a receiver, the first unit including a transmitter for transmitting information to the receiver of the second unit, and a receiver for receiving information from the transmitter of the second unit, the first unit including a scanner for scanning the unit along at least one axis with respect to the second unit. The first unit further includes a control for terminating the scanning of the first unit when the receiver of the first unit is precisely aligned with the transmitter of the second unit.

16 Claims, 6 Drawing Sheets

WIRELESS COMMUNICATION SYSTEM

This is a continuation of copending application Ser. No. 08/126,800 filed on Sep. 24, 1993.

The present invention relates to a wireless communication system and in particular to an infrared wireless communication system between two locations, at least one of which may assume a non-constant special disposition with respect to the other before or during operation.

Most common examples where such communication systems are useful are: a) an aircraft and a ground station while the aircraft is on the ground at a terminal gate, where precise alignment therebetween is not possible or feasible, and b) a multiplicity of desktop portable computers receiving and transmitting data from a master and each other.

It is well known that there are two distinct approaches to use of wireless optical (infrared) beams in LAN applications. Terminals within such a system can be moved and relocated at will within the coverage area without rewiring. The diffusive approach, which makes it possible to do this, obviates the need for accurate alignment between transmitter and receiver. The use of multiple reflections from walls and ceilings, however, results in a substantial temporal dispersion. The multipath reception limits the maximum transmission data rate to about 1 Mbps for the portable computer applications.

By using directed optical beams, the effects of multipath dispersion are significantly lowered to levels where communication with data rates of 100 Mbps and higher can be achieved. System performance is, however, dependent on aiming or pointing accuracy. Directed beam systems are therefore not suitable for mobile-static and mobile-mobile applications.

Concerning the application of the present invention with respect to aircraft-ground communication, various types of information must be communicated to an aircraft, such as passenger information, flight control, navigation, maintenance and schedule, etc., while the aircraft is parked on the ground. One method for accomplishing this is by establishing a physical connection, such as a wire or optical-fiber link, between the ground station and the aircraft. Both of these techniques, however, require connection and disconnection of the physical link, which involve extra labour, delays, and difficult maintenance problems, particularly when the links are by optical fibers which must be kept dust and dirt-free.

It is therefore a broad object of the present invention to overcome the above disadvantages of the known systems and to provide a wireless auto-scan and/or auto-aiming communication system.

It is a further object of the present invention to provide a wireless communciation system useful for communicating large amounts of information within a relatively short period of time.

According to the present invention, there is provided a wireless communication system, comprising first and second communication units located, in operation, in spaced-apart relationship to each other, each unit including a transmitter and a receiver, said first unit including a transmitter for transmitting information to the receiver of the second unit, and a receiver for receiving information from the transmitter of the second unit, said first unit including scanning means for scanning the unit along at least one axis with respect to said second unit, said first unit further including control means for terminating the scanning of the first unit when the receiver of the first unit is aligned with the transmitter of the second unit.

According to further features in the preferred embodiment of the invention described below, the transmitter of each unit is fixed at a predetermined distance from the receiver of the respective unit, which distance is the same for both units, such that when the receiver of the first unit is aligned with the transmitter of the second unit, the transmitter of the first unit is also aligned with the receiver of the second unit.

According to still further features of the described preferred embodiment, the transmitters are infrared devices transmitting fan-shaped infrared beams, and the receivers are infrared detectors detecting the infrared beams. The second unit also includes means for scanning the unit along at least one orthogonal axis with respect to the first unit, and control means for terminating the scanning of the second unit when the receiver of the second unit is precisely aligned with the transmitter of the first unit.

According to still further features in the described preferred embodiment, each of the scanning means includes both azimuth scaning means and elevation scanning means. The azimuth scanning means comprises a motor which rotates the respective unit horizontally about a vertical axis for a sector of a circle. In the described preferred embodiment, each of the infrared transmitters includes a plurality of infrared devices oriented to transmit a vertical fan-shaped beam, and the elevation scanning means comprises switching means for selectively energizing the infrared devices.

As will be more fully described below, such a wireless communication system obviates the need for a physical connection between the two units, and effects rapid lock-on between the two units, thereby making the system particularly advantageous in many applications where a precise alignment of the two transceivers operating in full duplex mode is not feasible, such as for providing communication between a parked aircraft and the terminal gate.

The invention will now be described in connection with certain prefered embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
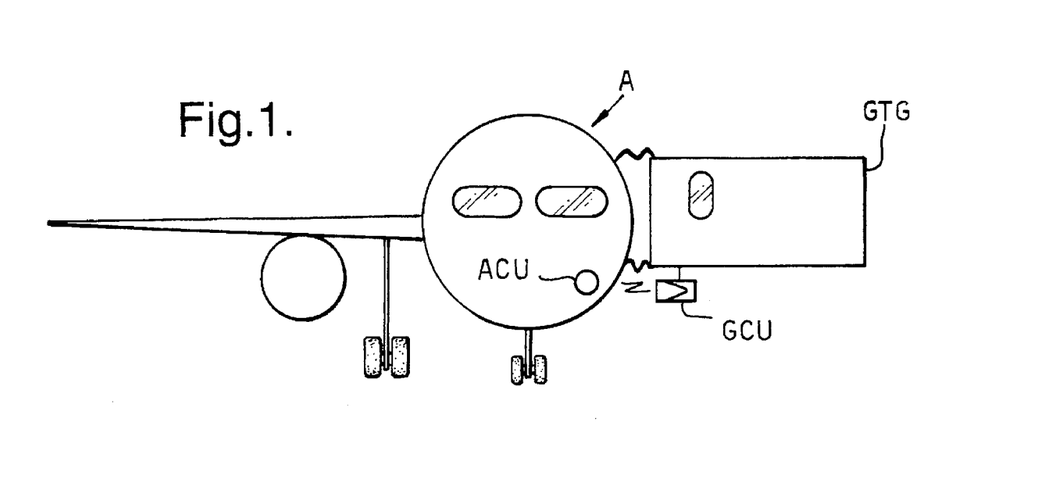
FIG. 1 illustrates one application of the invention, for providing communication between a parked aircraft and a terminal gate.

FIG. 1 illustrates an aircraft A coupled to a ground terminal gate (GTG) for receiving passengers boarding the aircraft or deplaning from the aircraft. The aircraft includes an aircraft transceiver unit (ATU) located to be a short distance from a ground transceiver unit (GTU) to permit communication between the aircraft and the ground. Heretofore, such communication was effected by a physical link between the aircraft and ground, such as by electrical conductors or by airline operating personnel commuting back and forth between the airplane and the airport offices with hard copies or diskettes. According to the present invention, ATU and GTU are communicating by a wireless link, thereby avoiding many of the disadvantages in using a physical connection, such as additional manpower and time required for making and breaking the connection, for maintaining the physical connection dust free, etc.

Figures 2, 3:
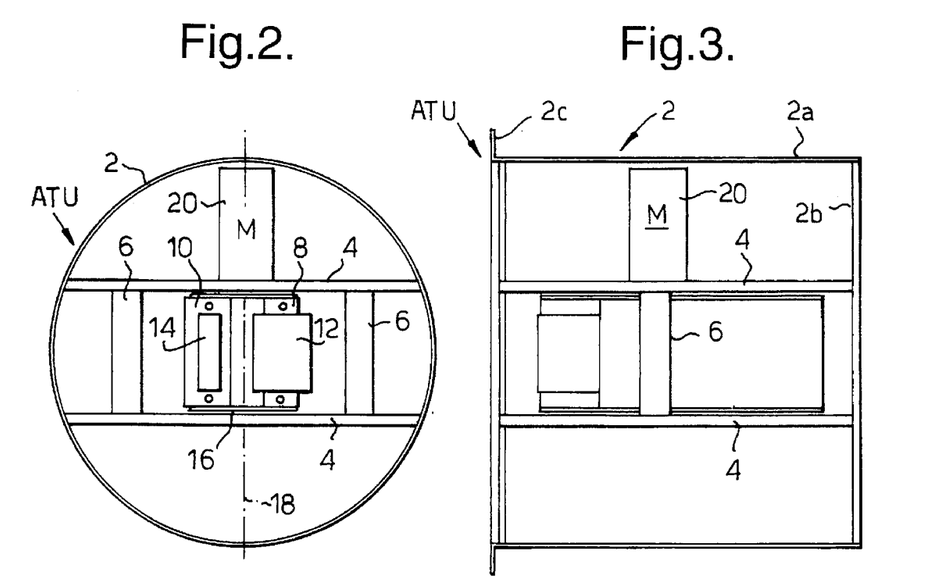
FIGS. 2 and 3 are front and side elevational views, respectively, illustrating the communication units in the aircraft and terminal gate in FIG. 1.

FIGS. 2 and 3 more particularly illustrate the ATU structure, but it will be appreciated that the GTU structure is substantially the same. Thus, the ATU includes a cylindrical housing 2, constituted of a cylindrical shell 2a, a circular back closure plate 2b, and an annular front mounting plate 2c for mounting the housing to the aircraft (or to the terminal gate). Within housing 2 is a frame constituted of a pair of horizontal mounting plates 4 spaced apart vertically by a pair of spacer posts 6. An infrared (IR) transmitter 8 and an IR receiver 10 are mounted in side-by-side relation at a fixed distance from each other between plates 4. A cylindrical lens 12 is mounted forwardly of the IR transmitter 8, and another cylindrical lens 14 is mounted forwardly of the IR receiver 10.

The transmitter 8 and receiver 10, together with their cylindrical lenses 12 and 14, are mounted on a common base 16. Base 16 is pivotal about the vertical axis 18, by a motor 20.

As further seen in FIGS. 4 to 7, the transmitter 8 in the ATU (as well as in the GTU) includes three IR emitters $E_1$ to $E_3$ disposed in an arcuate array behind cylindrical lens 12, so that they produce, together with the cylindrical lens, a fan-shaped IR beam 13. The IR emitters $E_1$ to $E_3$ may be, for example, LEDs (light emitting diodes) emitting in the IR range.

Figure 6:
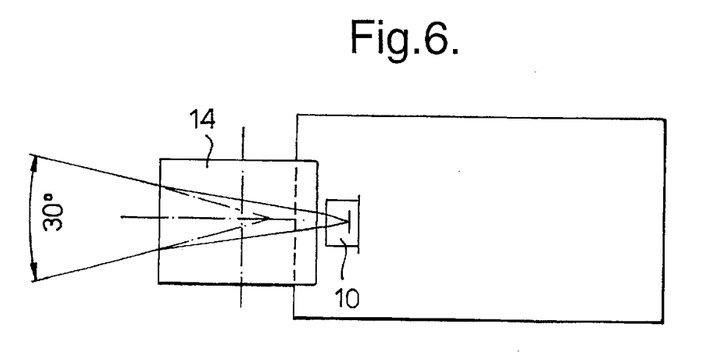
FIGS. 6 and 7 are top and front views, respectively, of the receiver in each of the communication unit of FIGS. 1 and 2.
Figure 7:
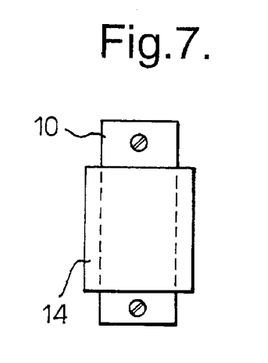

The receiver 10 is an IR detector and is located in the focal plane behind its cylindrical lens 14, so that the fan-shaped beam received from the transmitter of the other communication unit (the GTU) is focused to a focal point in the IR detector.

Figure 4:
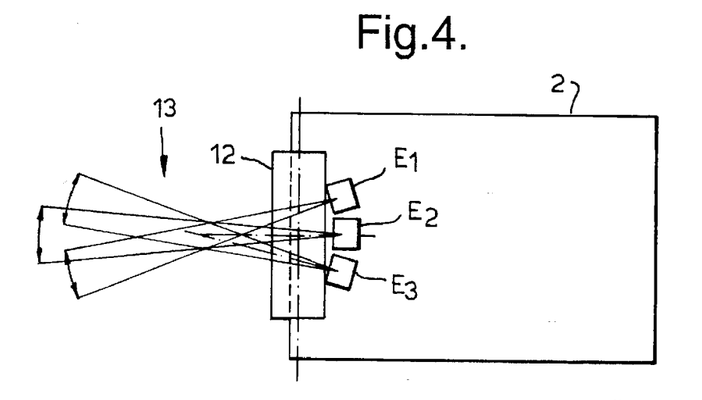
FIGS. 4 and 5 are side and front views of the transmitter in each of the two communication units of FIG. 1.
Figure 5:
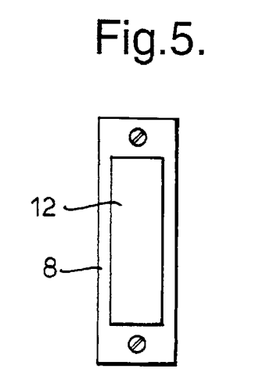

Motor 20 effects scanning in azimuth of the transmitter 8 and receiver 10 in the unit. Scanning in elevation is effected by sequentially energizing the three emitters $E_1$ to $E_3$ in the respective transmitter 8.

Figure 8:
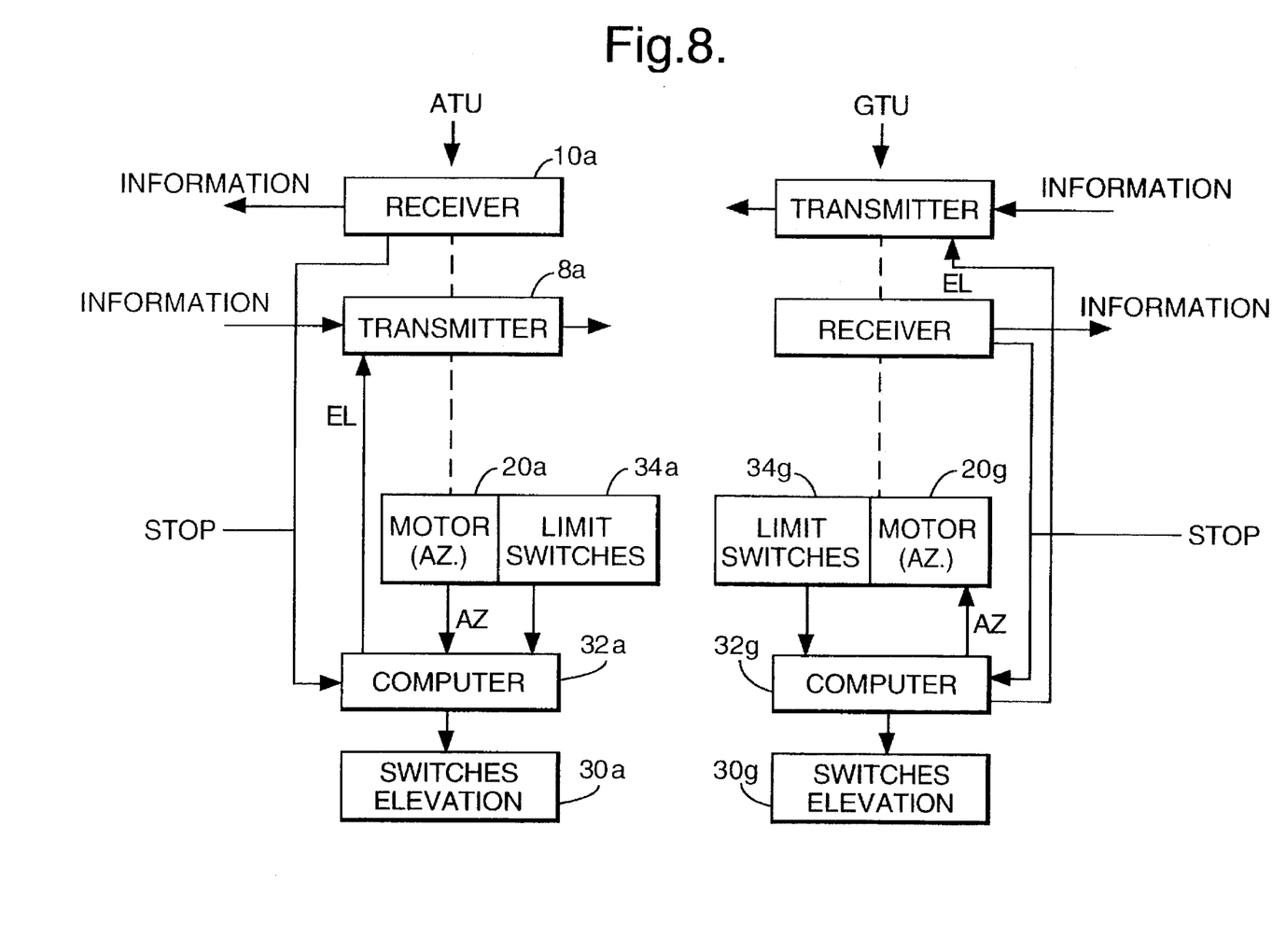
FIG. 8 is block diagram illustrating the scanning system in the two communication units of FIG. 1.

Referring to FIG. 8, the scanning system of the ATU is operated asynchronously with respect to the scanning system in the GTU. Thus, each unit includes, in addition to the above-described transmitter 8a, 8g, receiver 10a, 10g, motor 20a, 20g, elevation switching system 30a, 30g for effecting elevational scanning of the emitters $E_1$ to $E_3$ in each transmitter, and a computer 32a, 32g for controlling the operation of the azimuth motors 20a, 20g and the elevation switching systems 30a, 30g, respectively. Each communication unit further includes limit switches 34a, 34g which serve as inputs to their respective computers 32a, 32g for controlling the azimuth motors 20a, 20g.

The operation of the scanning system, as controlled by the two computers 32a, 32g in FIG. 8, will now be described, particularly with reference to the diagram of FIG. 9. As indicated earlier, the scanning system of the ATU and GTU operate asynchronously. The scanning system of the ATU, however, operates at a lower speed than that of the GTU. When the ATU receiver senses alignment with the GTU transmitter, the ATU stops scanning for a predetermined time (e.g., one second) while the GTU continues scanning until its receiver senses alignment with the ATU transmitter, at which time the GTU also stops scanning. If alignment (represented by continuous flag) does not occur within the predetermined time interval (e.g., one second), the ATU is displaced one step in one direction and again stops scanning. If alignment still does not occur, the ATU is displaced two steps in the opposite direction and again stops scanning. If alignment is still not sensed, the ATU is then displaced three steps in the first direction and again stops scanning. If alignment is still not sensed, the ATU then restarts the normal scanning movements as shown by steps 40a in FIG. 9.

Figure 9:
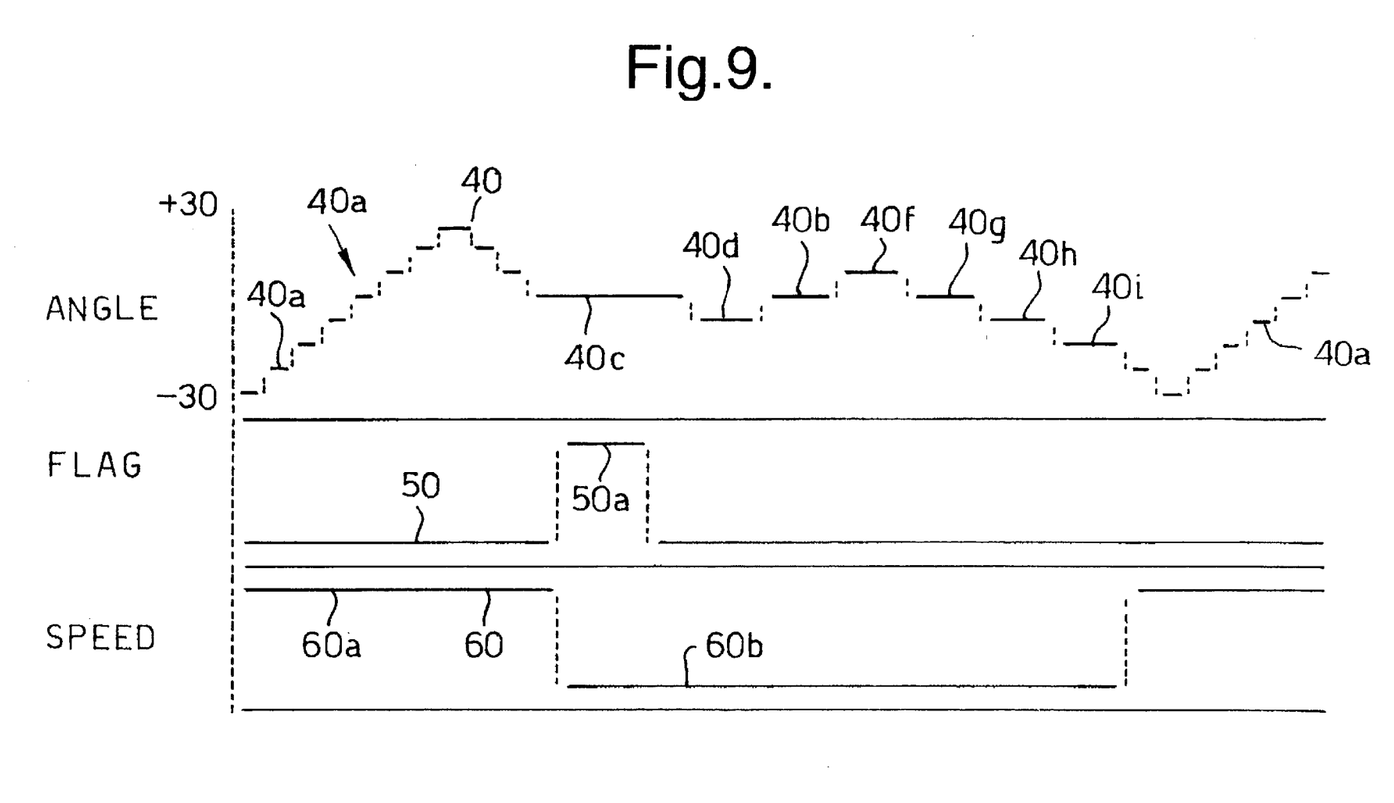
FIG. 9 illustrates a set of diagrams explaining the operation of the scanning system in the communication unit on the aircraft in FIG. 1.

Diagram 40 in FIG. 9 illustrates the changes in the azimuth angle with respect to time in the ATU, as controlled by its motor 20a. In the example illustrated, the transmitter and receiver of the ATU are oscillated in azimuth from $-30°$ to $-30°$, i.e., through a sector of 60°. A different sector could, of course, be utilized, preferably between 45° to 90°.

During the scanning operation, the motor 20a moves the transmitter 8a and receiver 10a of the ATU in steps of 1°. For the sake of convenience, diagram 40 illustrates a single step 40a for each group of ten actual steps. While motor 20a is moving the transmitter and receiver in azimuth, the switching system 30a for the ATU is effecting elevational scanning by sequentially switching the emitters $E_1$ to $E_3$ (FIG. 4) of the transmitter 8a. The elevational scanning frequency is faster than the azimuth scanning, e.g., about three times as fast.

While the ATU is effecting the scanning of its transmitter 8a and receiver 10a, both in azimuth and elevation, the GTU is also effecting the scanning of its transmitter 8g and receiver 10g both in elevation and azimuth. As stated hereinbefore, both units operate asynchronously and the scanning rate of the GTU is much faster than that of the ATU. For example, whereas the azimuth scanning in the ATU is about thirty scanning cycles per minute (one-half cycle per second), the scanning speed and azimuth of the GTU is preferably about ten times that (e.g., about 300 scanning cycles per minute, or about five cycles per second).

The ATU continues to effect the scanning up to the level 40b until it encounters a limit switch of switches 30a, whereupon the direction of scanning is reversed, or until its receiver 10a of the ATU indicates that it is precisely aligned with the transmitter 8g of the GTU, whereupon scanning in the GTU is terminated. This is indicated by horizontal line 40c. The scanning in the GTU is, however, presumably continuing, and therefore, receiver 10a of the ATU becomes non-aligned with the transmitter 8g in the GTU.

The scanning system in the ATU remains non-energized for a predetermined time interval, (e.g., one second) and waits for the receiver 10g of the GTU to become aligned with the transmitter 8a of the ATU. When this occurs, the scanning system of the GTU also terminates. The two units are thus locked-in, with the receiver of the ATU aligned with the transmitter of the GTU, and the transmitter of the ATU aligned with the receiver of the GTU. Communication may then be effected between the two units via the air link.

If, however, after scanning of the GTU has terminated (step 40c) and a predetermined time interval (e.g., one second) has passed without the receiver of the GTU becoming aligned with the transmitter of the ATU, operation of the scanning system of the ATU is restarted in the manner indicated by steps 40d–40i in FIG. 9. Thus, if realignment is not effected after the predetermined time interval, the ATU is first moved one step in one direction (line 40d), then two steps in the opposite direction (lines 40e, 40f), then three steps in the first direction (lines 40g, 40h, 40i); and if still alignment is not effected, the scanning system of the ATU returns to its normal searching mode as indicated by steps 40a to restart the search.

Diagram 50 in FIG. 9 illustrates at 50a when the receiver 10a in the ATU is aligned with the transmitter 8g in the GTU. Diagram 60 illustrates the scanning speed in azimuth, wherein it will be seen that the scanning speed is high, line 60a, until the receiver in the ATU senses alignment with the transmitter in the GTU, and then becomes much reduced line 60b, during the searching steps 40d–40i until the GTU stops in alignment with the ATU.

It has been found that such an arrangement enables the transmitters to emit fan-shaped infrared beams of relatively small width and small angles, and yet provide "lock-in" relatively quickly. In the example described above, the fan-shaped infrared beam emitted by the transmitters is of a width of about 2° and a height of about 30°. These dimensions, however, may vary, but preferably the width should be 1° to 5°, and the angle 20°–40°. Lock-in between the two communication units is generally effected within about ten seconds.

The above-described embodiments relate to aligning two full duplex transceivers automatically without the conventional split detector configuration. This configuration requires angular scanning at both transceivers simultaneously until a match is achieved.

For communication between a parked aircraft and a loading gate, this configuration requires moving parts, particularly a motor in the aircraft, which movement is normally unwarranted. Since there is, however, no such limitation on the ground side, the GTU can be scanned linearly, rather than angularly, thus ensuring that at one point the GTU will be opposite the ATU.

In practice, there my also be some angular misalignment between the aircraft and the gate. This requires angular scanning superimposed on the linear scan. One solution to this problem is the use of a separate motor to rotate the transceiver system independent of the linear scanning.

Figure 10:
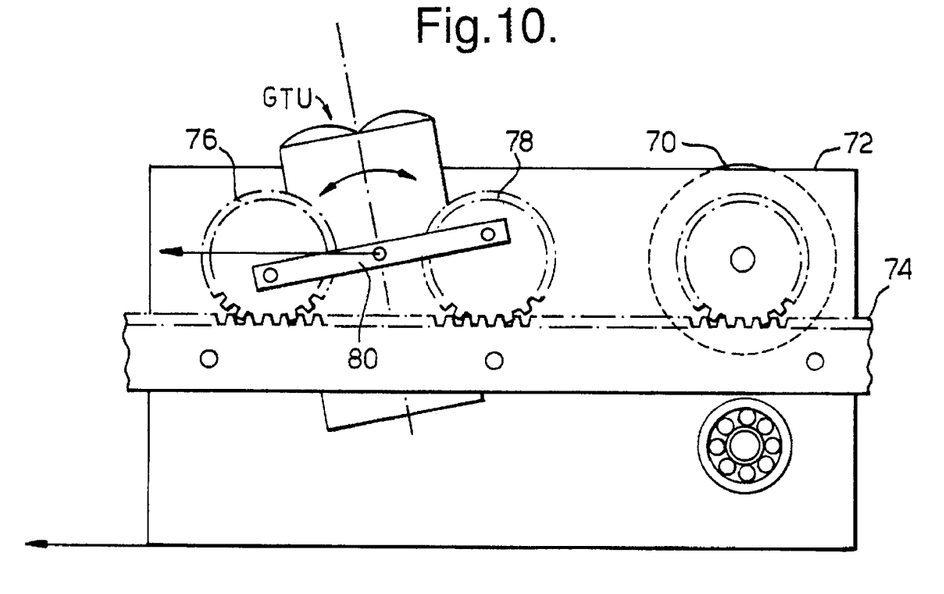
FIG. 10 is a schematic illustration of a mechanical, combined linear and angular scanning arrangement.

Alternatively, a combined reciprocating linear and angular motions of, e.g., the GTU can also be provided. An example of an arrangement providing combined linear and angular motions to a GTU is shown in FIG. 10. In this embodiment a motor 70 is attached to a carriage 72, and drives the carriage at a constant speed using a stationary rack 74. Gears 76 and 78 are mounted eccentrically and connected by a link 80, which link reciprocates synchronously with the linear motion. This type of scanning moves the carriage 72 at a high angular rate compared with the linear rate.

Figure 11:
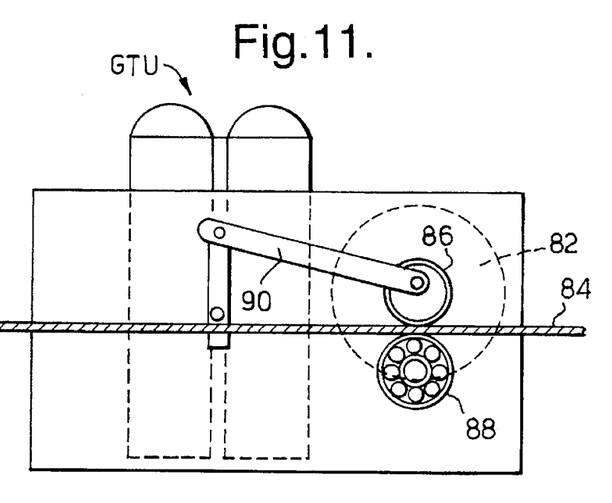
FIG. 11 is a schematic illustration of a further embodiment of a mechanical, combined linear and angular scanning arrangement.

Instead of the scanning arrangement illustrated in FIG. 10, a less expensive arrangement as seen in FIG. 11, can be provided. Accordingly, the combined linear and angular scanner comprises a motor 82 driving the GTU along a guiding profile 84 by means of a friction roller 86 and bearing 88. The roller 86 is eccentrically coupled with the GTU via a link 90 for effecting the superposed angular motion of the GTU.

Figure 12:
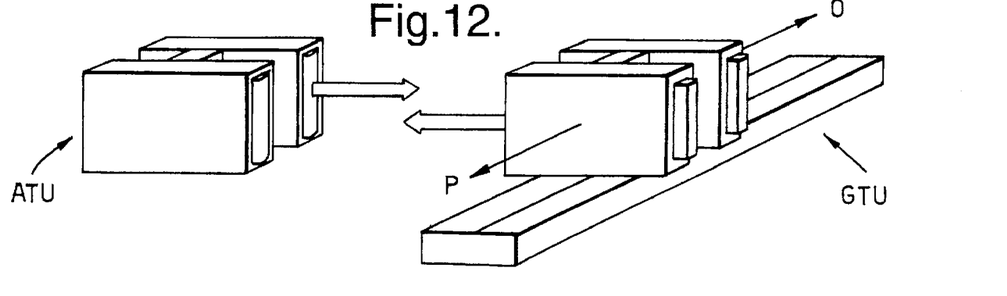
FIGS. 12 and 13 are representations of a scanning system and radiation pattern according to the present invention.
Figure 13:
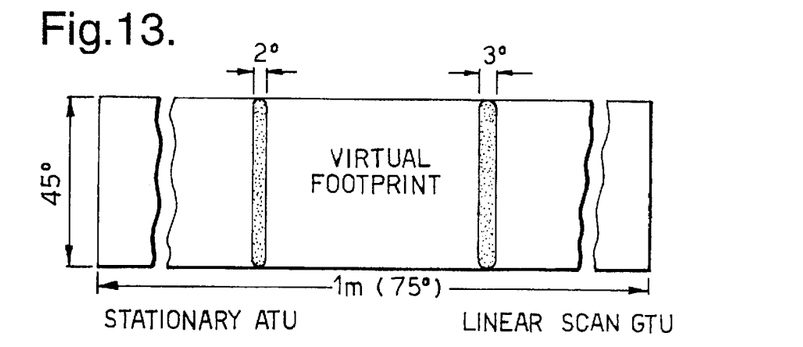

Referring to FIGS. 12 and 13 there is schematically illustrated the scanning system according to the present invention, wherein the ATU is stationary while the GTU is adapted to perform a linear reciprocating scanning motion in the direction of the arrows P and Q. As seen in FIG. 13, the patterns of the signal-in-space or the so-called, optical footprints of the beams, in the example show two substantially rectangular beams. The stationary ATU beam covers about a 2° angle in width, while the moveable GTU beam covers a wider angle of about 3°. Both beams are radiated at an elevation of about 45°, so that the beams will intersect over wide azimuthal and deviational ranges.

Figure 14:
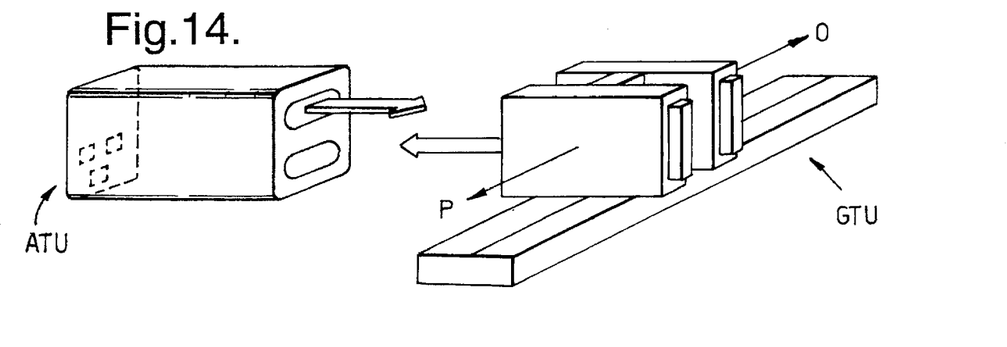
FIGS. 14 and 15 are representations of a modification of a scanning system and radiation pattern according to the present invention.
Figure 15:
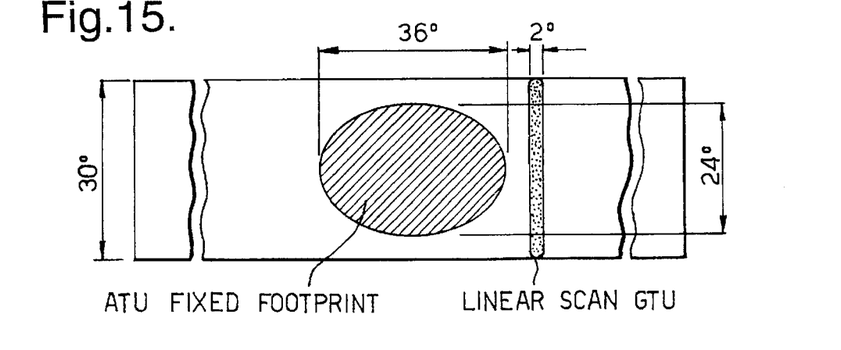

In FIGS. 14 and 15 there are depicted a similar stationary ATU and a reciprocating GTU, however, with a different configuration of the ATU beam footprint, which, as shown, is oval or elipsoid. In this case, the width of the beam extends over an angle of about 36° at an elevation of 24° and both beams are radiated at an elevation of about 30°.

As can now be readily understood, there are several advantages gained by the angular or linear scan systems over stationary systems:

1) The angular coverage of the scanning system is significantly greater, thus allowing for higher degrees of relative motion and angular misalignment;

2) The susceptibility to background noise radiation (particularly bright sunlight, glint and gate lights) is much lower (by at least a factor of 10) for the scanning system, since the instantaneous field-of-view is much smaller, and 3) The signal power densities are much higher with the scanning system allowing for higher fade margins.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A wireless data communication system for communicating between an airplane and a ground loading terminal, comprising:

a. a ground communication unit coupled to a ground terminal and mounted on a loading gateway adapted to approach and engage a parked airplane to enable loading and unloading of the airplane, said ground communication unit including a ground communication infrared transmitter transmitting a fan shaped infrared beam with a pattern which is narrower in the horizontal direction and wider in the vertical direction and comprising a plurality of infrared devices oriented to transmit said fan shaped infrared beam, an elevation scanning means comprising switching means for selectively energizing said plurality of infrared devices, azimuth scanning means driven by a stepping motor for scanning in a substantially horizontal direction with respect to the ground, a ground communication receiver comprising an infrared detector for detecting an infrared beam and having a field of view which is narrower in the horizontal direction and wider in the vertical direction, and a controller for controlling the operation of said ground communication unit elevation and azimuth scanning means;

b. an airplane communication unit including an airplane communication infrared transmitter transmitting a fan shaped infrared beam with a pattern which is a narrower in the horizontal direction and wider in the vertical direction and comprising a plurality of infrared devices oriented to transmit said fan shaped infrared beam, an elevation scanning means comprising switching means for a selectively energizing said plurality of infrared devices, azimuth scanning means driven by a stepping motor for scanning in a substantially horizontal direction with respect to the ground, an airplane communication receiver comprising an infrared detector for detecting an infrared beam and having a field of view which is narrower in the horizontal direction and wider in the vertical direction, and a control means for controlling the operation of the airplane communication unit elevation and azimuth scanning means;

c. wherein the infrared transmitter of the airplane communication unit and the infrared transmitter of the ground communication unit are fixed a predetermined distance from the receiver of that same unit, which distance is substantially the same for both the airplane communication unit and the ground communication unit, such that when the receiver of the airplane communication unit is aligned with the transmitter of the ground communication unit, the transmitter of the airplane communication unit is also aligned with the receiver of the ground communication unit;

d. said controller of the ground communication unit terminates scanning of said ground communication unit elevation and azimuth scanning means when the receiver of said ground communication unit receives the infrared beam transmitted from the transmitter of said airplane communication unit;

e. said control means of the airplane communication unit terminates operation of its elevation and azimuth scanning means when its receiver becomes aligned with the transmitter of the ground communication unit, and maintains the operation terminated even when its receiver becomes misaligned with the transmitter of the ground communication unit by the operation of the scanning means of the ground communication unit, but restarts operation of its elevation and azimuth scanning means when its receiver fails to become realigned with the transmitter of the ground communication unit after a predetermined time interval.

2. The system according to claim 1, wherein each azimuth scanning means stepping motor oscillates its respective unit horizontally about a vertical axis for a sector of a circle.

3. The system according to claim 1, wherein the stepping motor of the azimuth scanning means of the airplane communication unit effects about thirty scanning cycles per minute.

4. The system according to claim 1, wherein the stepping motor of the azimuth scanning means of the ground communication unit effects about three hundred scanning cycles per minute.

5. The system according to claim 1, wherein each of said infrared transmitters includes three infrared devices, and each said switching means selectively energizes the infrared devices a plurality of times for each step of the stepping motor.

6. The system according to claim 1, wherein the azimuth scanning means of said airplane communication unit operates at a slower speed than the azimuth scanning means of said ground communication unit.

7. The system according to claim 1, wherein said control means of the airplane communication unit, before restarting operation of its scanning means, first displaces the airplane communication unit a single step in a first direction, and then two steps in a second direction opposite to said first direction.

8. The system according to claim 1, wherein one of said units includes a drive means for effecting a controlled reciprocating motion of that unit.

9. The system as claimed in claim 8, wherein said drive means includes a mechanical arrangement imparting combined linear and angular motions to said one unit.

10. The system according to claim 2, wherein the azimuth scanning means of said airplane communication unit operates at a slower speed than the azimuth scanning means of said ground communication unit.

11. The system according to claim 10, wherein the stepping motor of the azimuth scanning means of the airplane communication unit effects about thirty scanning cycles per minute.

12. The system according to claim 11, wherein the stepping motor of the azimuth scanning means of the ground communication unit effects about three hundred scanning cycles per minute.

13. The system according to claim 12, wherein each of said infrared transmitters includes three infrared devices, and each said switching means selectively energizes the infrared devices a plurality of times for each step of the stepping motor.

14. The system according to claim 13, wherein said control means of the airplane communication unit, before restarting operation of its scanning means, first displaces the airplane communication unit a single step in a first direction, and then two steps in a second direction opposite to said first direction.

15. The system according to claim 14, wherein one of said units includes a drive means for effecting a controlled reciprocating motion of that unit.

16. The system according to claim 15, wherein said drive means includes a mechanical arrangement imparting combined linear and angular motions to said one unit.

* * * * *